United States Patent
Albassam et al.

(10) Patent No.: US 12,540,547 B2
(45) Date of Patent: Feb. 3, 2026

(54) MEASURING BOTTOM-HOLE TEMPERATURE WITH SMART POLYMERS

(71) Applicant: Saudi Arabian Oil Company, Dhahran (SA)

(72) Inventors: Mohammed Albassam, Alkhobar (SA); Arturo Magana Mora, Dhahran (SA); Chinthaka Pasan Gooneratne, Dhahran (SA); Mohammad Aljubran, Sayhat (SA); Peter Boul, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 508 days.

(21) Appl. No.: 17/960,353

(22) Filed: Oct. 5, 2022

(65) Prior Publication Data
US 2024/0117738 A1 Apr. 11, 2024

(51) Int. Cl.
*E21B 49/08* (2006.01)
*C09K 8/24* (2006.01)
*G01N 33/24* (2006.01)

(52) U.S. Cl.
CPC ............ *E21B 49/0875* (2020.05); *C09K 8/24* (2013.01); *G01N 33/24* (2013.01)

(58) Field of Classification Search
None
See application file for complete search history.

(56) References Cited

U.S. PATENT DOCUMENTS

| | | |
|---|---|---|
| 10,905,636 B2 | 2/2021 | Musa et al. |
| 11,939,827 B1 | 3/2024 | Albassam et al. |
| 2017/0059629 A1 * | 3/2017 | Jackum ................. G01R 17/02 |
| 2019/0375978 A1 | 12/2019 | Shojaei et al. |
| 2019/0382519 A1 | 12/2019 | Musa et al. |
| 2024/0110476 A1 | 4/2024 | Albassam et al. |

(Continued)

OTHER PUBLICATIONS

Bhattacharya et al., "Mechanical-Bending-Induced Fluorescence Enhancement in Plastically Flexible Crystals of a GFP Chromophore Analogue," Angewandte Chemie, Jul. 2020, 132(45):20050-20055, 6 pages.

(Continued)

*Primary Examiner* — Matthew G Marini
(74) *Attorney, Agent, or Firm* — Fish & Richardson P.C.

(57) ABSTRACT

Systems and methods include techniques for using smart polymers. Units of smart polymers with heat sensitivity are inserted by a monitoring system into drilling fluid pumped into a well. The smart polymers are configured to be triggered by exposure to increasing levels of heat. An insertion timestamp associated with each unit is stored. Each insertion timestamp indicates a time that each unit was inserted. Continuous images and observed characteristics of returning mud exiting through an annulus of the well and containing the units of smart polymer are captured by a camera positioned at a sensing location and linked to the monitoring system. An estimate of temperatures at a drill bit of the drilling operation is determined using continuous images, observed characteristics, and insertion timestamps, based at least in part on executing image processing algorithms, machine-learning models, and deep-learning models. Suggested changes to be made to drilling parameters are provided.

20 Claims, 10 Drawing Sheets

(56) References Cited

U.S. PATENT DOCUMENTS

2024/0117737 A1  4/2024  Albassam et al.
2024/0118213 A1  4/2024  Albassam et al.

OTHER PUBLICATIONS

Guo et al., "Fluorescence Chemosensors for Hydrogen Sulfide Detection in Biological Systems," Analyst, Mar. 2015, 140(6):1772-1786, 18 pages.

Gustafson et al., "Design of Irreversible Optical Nanothermometers for Thermal Ablations," Chemical Communications, Jan. 2013, 49(7):680-682, 3 pages.

Han et al., "Fluorescent Indicators for Intracellular pH," Chem. Rev., May 2010, 110(5):2709-2728, 20 pages.

Herrmann, "Dynamic Combinatorial/Covalent Chemistry: A Tool to Read, Generate and Modulate the Bioactivity of Compounds and Compound Mixtures," Chemical Society Reviews, Mar. 2014, 43(6):1899-1933, 36 pages.

Li et al., "Dually emitting carbon docts as fluorescent probes for ratiometric fluorescent sensing of pH values, mercury(II), chloride and Cr(VI) via different mechanisms," Microchimica Acta, May 2019, 186(6):341, 10 pages.

Qu et al., "Polyethyleneimine-templated Ag nanoclusters: A new fluorescent and colorimetric platform for sensitive and selective sensing halide ions and high disturbance-tolerant recognitions of iodide and bromide in coexistence with chloride under condition of high ionic strength," Analytical Chemistry, Nov. 2012, 84(23):10373-10379, 7 pages.

Stefani et al., "Thermochromic Fluorophores and Their NIR Laser Induced Transformation," Chemistry of Materials, Dec. 2006, 18(26):6115-6120, 6 pages.

Tollan et al., "Irreversible Thermochromic Behavior in Gold and Silver Nanorod/Polymeric Ionic Liquid Nanocomposite Films," ACS Applied Materials & Interfaces, Feb. 2009, 1(2):348-352, 5 pages.

Yu et al., "Carbon-Dot-Based Ratiometric Fluorescent Sensor for Detecting Hydrogen Sulfide in Aqueous Media and inside Live Cells," Chemical Communications, Jan. 2013, 49(4):403-405, 3 pages.

* cited by examiner

MEASURING BOTTOM-HOLE TEMPERATURE WITH SMART POLYMERS

TECHNICAL FIELD

The present disclosure applies to measuring and estimating conditions while drilling wells, e.g., oil wells.

BACKGROUND

Accurate prediction of downhole temperatures is extremely important in drilling oil and gas wells. The measurement of the downhole temperature is a challenging task due to extreme downhole conditions (e.g., high pressure and high temperature), but is an essential task to ensure a safe drilling environment. Undesirable downhole temperatures while operating under extreme conditions may lead to downhole tool failures. An accurate fluid temperature profile in the annulus is essential to ensure a safe drilling operation, as drilling fluid properties are sensitive to temperature. In addition, a change in temperature may lead to change in fluid properties. Temperature has an inversely proportionate relationship with fluid viscosity, meaning that an increase in fluid temperature leads to a decrease in viscosity. Moreover, monitoring downhole temperatures can aid in detecting formation geo-fluid kicks that may occur downhole.

One of the main functions of drilling fluids is to carry cuttings from downhole to the surface. Drilling fluids are capable of doing so with the aid of viscosity, which suspends cuttings and prevents the cuttings from falling down to the bottom hole. However, as the fluid's temperatures increase, the viscosity decreases due to an increase in kinetic energy, which allows the molecules to become more mobile. A decrease in the fluid's viscosity can result in poor carrying capacity of drilling fluids and can ultimately lead to poor hole cleaning, which is an undesirable event during drilling operations. Poor hole cleaning is a major contributor to other non-productive time, such as stuck pipe incidents, loss of drilling fluid circulation, and formation fracturing. These conditions can be induced due to the high equivalent circulating density (ECD) caused by the presence of excess cuttings. One frequent and global cause of stuck pipe incidents is the inefficient removal of drill cuttings from the wellbore while drilling.

Another main function of drilling fluid is to cool off the drill bit. Downhole heat transfer occurs between the rock formation and the drilling fluid by way of convection. One function of the drilling fluid is to absorb the heat that the formation dissipates and to ensure that downhole tools do not exceed their maximum temperature ratings. Operating downhole tools in a temperature exceeding the maximum rating may lead to tool failure, which can be costly and may risk losing an entire well.

Continuous monitoring of the bottom-hole maximum temperature can aid in downhole kick detection. Formation temperature is higher than drilling fluid temperature since the drilling fluid's function is to cool the bit and other tools. Abnormal (relative to the well) drilling fluid temperature may occur if formation fluids enter the wellbore and mix with the current drilling fluid.

SUMMARY

The present disclosure describes techniques for using smart polymers and a camera positioned in a well (e.g., at a shale shaker) to evaluate downhole temperature at different timestamps. The evaluation can occur multiple times after the smart polymers are injected into drilling fluid, exposed to downhole conditions, and returned in drilling mud. In some implementations, a computer-implemented method includes the following. Units of smart polymers with heat sensitivity are inserted by a monitoring system into drilling fluid pumped into a well during a drilling operation. The smart polymers are configured to be triggered by exposure to increasing levels of heat experienced in the well. An insertion timestamp associated with each unit is stored by the monitoring system. Each insertion timestamp indicates a time that each unit was inserted into the drilling fluid. Continuous images and observed characteristics of returning mud exiting through an annulus of the well and containing the units of smart polymer are captured by a camera positioned at a sensing location and linked to the monitoring system. An estimate of temperatures at a drill bit of the drilling operation is determined by the monitoring system using the continuous images, the observed characteristics, and the insertion timestamps associated with each unit of smart polymer. Determining the estimate is based at least in part on executing image processing algorithms, machine-learning models, and deep-learning models. Suggested changes to be made to drilling parameters for the drilling operation are provided by the monitoring system based at least in part on the estimate of the temperatures.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages.

The techniques of the present disclosure provide a robust, efficient technique for measuring maximum downhole temperatures. The techniques address current limitations of conventional systems regarding making downhole temperature measurements of a well. Temperature measurements are often estimated using an already established geo-thermal gradient for specific areas. Multiple wells are to be drilled and logged in order to establish an accurate geo-thermal gradient. This may not be an issue for a mature area where multiple wells have been drilled and abundant data has been acquired via downhole logs. However, this is not the case for exploration/delineation areas where not many wells have been drilled. Current conventional techniques for acquiring temperature data in exploration wells include running temperature logs with other logging while drilling (LWD) tools. This type of operation can require several days to complete depending on open hole logging requirements. In addition, temperature measurements collected while running LWD tools do not provide continuous measurements of wellbore temperatures. In such cases, the measurements are often accomplished during a downtime of the well to collect temperature data in the absence of a tool that enables the continuous measurements of downhole temperature values. Use of the techniques can help to ensure that the well bore temperatures are within acceptable temperature ratings and ranges that enable downhole drilling tools and drilling mud to operate safely and effectively. Intervention-less measurements of maximum downhole temperatures are useful for designing cement recipes which are major wellbore components requiring knowledge of down-hole temperatures. If the cement recipe were designed incorrectly with respect to maximum downhole temperatures, then the cement slurry ingredients can potentially disintegrate and fail to solidify to produce desired mechanical properties. As a result of such a failure, wellbore integrity could be jeopardized. Moreover, the technologies incorporated in the present disclosure take advantage of emerging technologies aligned with the fourth industrial revolution (4IR), such as automation, Internet of Things (IoT), artificial intelligence (AI) machine learning, and data analytics. The techniques can include the use of a camera at the shale shaker and smart polymers to evaluate the maximum downhole temperature at different timestamps. This technique can eventually enable the user to construct a temperature profile for the well.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
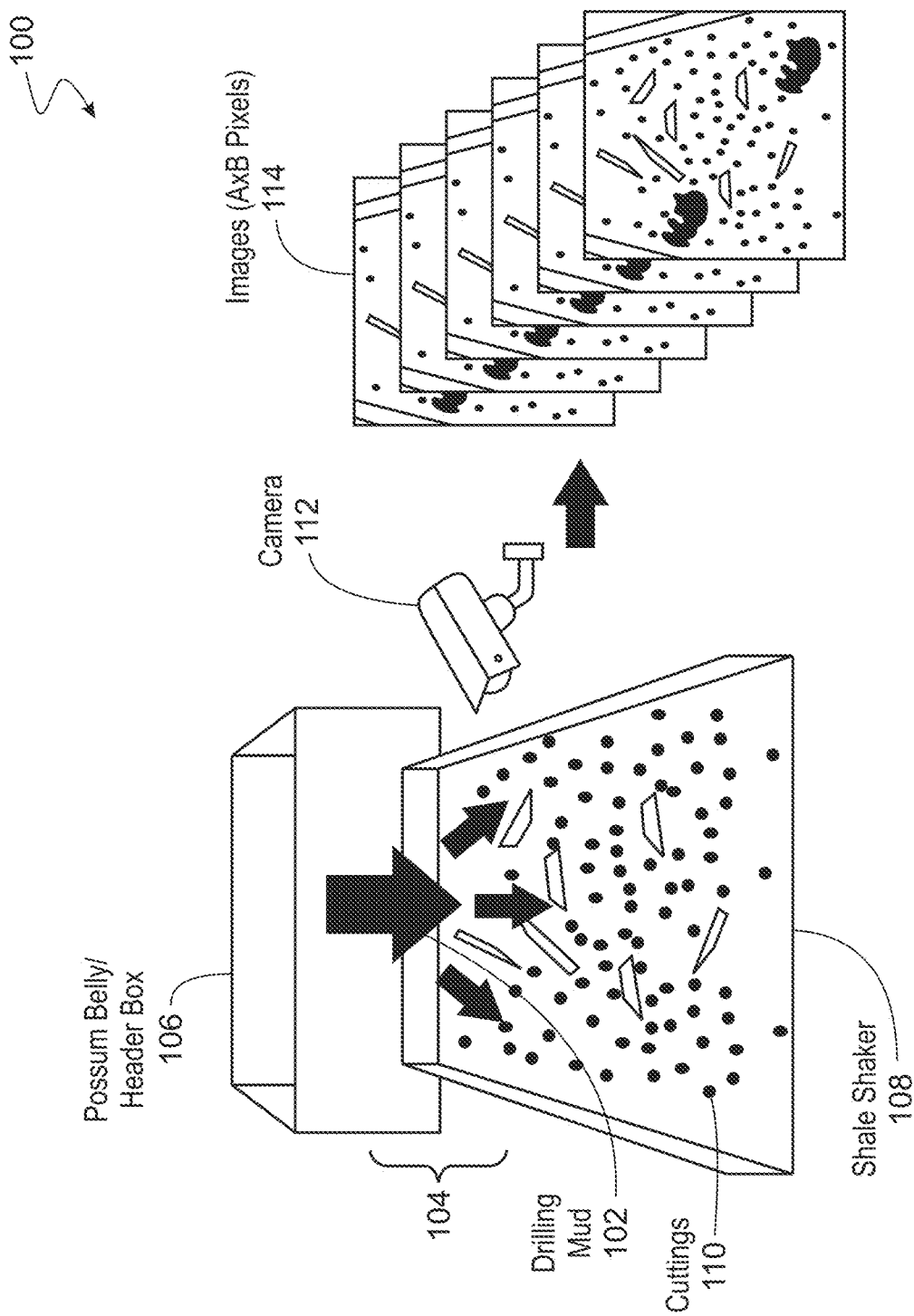
FIG. 1 is a plan view of an example of a shale shaker configuration, according to some implementations of the present disclosure.

The following detailed description describes techniques for using smart polymers and a camera positioned in a well (e.g., at the shale shaker) to evaluate downhole temperature at different timestamps, e.g., after the smart polymers are injected into drilling fluid, exposed to downhole conditions, and returned in drilling mud. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The measurement of the downhole temperature is a challenging task due to extreme downhole conditions, including high pressures and high temperatures. Measuring downhole temperatures is an essential task to ensure a safe drilling environment.

This present disclosure describes a system for using smart fluids/polymers that react to temperature stimuli and a camera at the shale shaker to capture images used to predict/estimate maximum downhole temperatures. The system includes the use of an internet of things (IoT) platform on a drilling rig. Such a system can include: 1) smart, waterproof, high-resolution, wireless cameras, or any other image or vision sensor for image/video capture, including infrared, gamma ray, CT scan, and x-ray; 2) edge/fog computing hardware; 3) smart polymers; and 4) software implementing image/video processing and artificial intelligence algorithms to automatically capture bottom hole temperatures from observed polymer characteristics at the shale shaker.

The techniques include the use of a camera recording drilling mud returns at the shale shaker to estimate the bottom-hole temperature. For example, the techniques can make use of temperature as a trigger to change the color/intensity of smart polymers/fluids. The change in color/intensity of smart polymers/fluids can be automatically detected by computational models that analyze frames captured by the camera. Smart polymers refer to and include stimuli-responsive polymers that change properties according to environments in which they are placed. Different stimuli can include, for example, pressure, temperature, potential of hydrogen (pH), and ionic strength. Changes in properties can include, for example, shape, chemical properties, and color. The present disclosure focuses on temperature as a trigger to change the color of smart polymers/fluids. The change of color can be detected by one or more cameras at one or more locations (e.g., including a location at the shale shaker).

Types of stimuli-responsive polymers include reversible and irreversible. Reversible polymers return to their natural state once the trigger has been eliminated from the environment. The present disclosure focuses on irreversible polymers, where properties do not return back to their initial state. Irreversible polymers can enable the detection of the maximum downhole temperature measured at any given wellbore depth, often occurring at the drill bit due to the geo-thermal gradient. However, in some cases, the maximum measured downhole temperature may not be at the bottommost depth, but rather at shallower zones due to a fluid influx from the formation.

Using techniques described in the present disclosure, smart polymers are designed to be pumped with the drilling fluid as pills. For example, the pills can be pumped with the drilling fluid at different intervals (e.g., every 1/3/5 minutes) or can be pumped every one stand (e.g., every 90 feet). Such temperature-responsive are designed to be triggered by heat, changing properties as a function of heat that is applied. As each pill exits the well through the annulus, a camera at the shale shaker captures continuous images of the returning mud and uses image processing algorithms as well as machine-learning (ML)/deep-learning (DL) models to predict/estimate maximum downhole temperatures. The model then correlates the timestamp of each pill's arrival at the shale shaker with the respective hole depth by utilizing the rig sensor for mud flowrate and knowing the annular area of the well.

FIG. 1 is a plan view of an example of a shale shaker configuration 100, according to some implementations of the present disclosure. Drilling mud flow 102 direction is represented by arrows 104. The mud enters a solids control process from a possum belly/header box 106. In this example, gravity feeds the mud into the vibrating basket of a shale shaker 108, loaded with course and fine mesh screens designed to sort the solids (e.g., cuttings 110) from the liquid phase. The mud moves from top to bottom, as shown in FIG. 1, through a motion caused by shaker basket vibration. As the drilling mud travels, the vibrational impact with the screen causes liquid/solid separation and/or drying. Upon discharge at the bottom of the shale shaker 108, the solids are discarded (as shown) while the liquid (and fine solids, depending on screen size) pass into the sump tank for further treatment and ultimate recycling for re-pumping downhole. A camera 112 is used to capture images 114, e.g., of dimension size AxB. The images 114 are processed by image processing algorithms and ML to convert analog data (e.g., intensity, color, and light) to numerical temperature data. Vision sensing can occur at multiple locations using multiple cameras, for example, as solids discharge from one or more of the shale shaker, centrifuges, de-sanders, de-silters, and locations using other solids control technologies. However, the present disclosure focuses on the shale shaker, with surface screening of solids in a load and discharge configuration as shown in FIG. 1.

Figure 2:
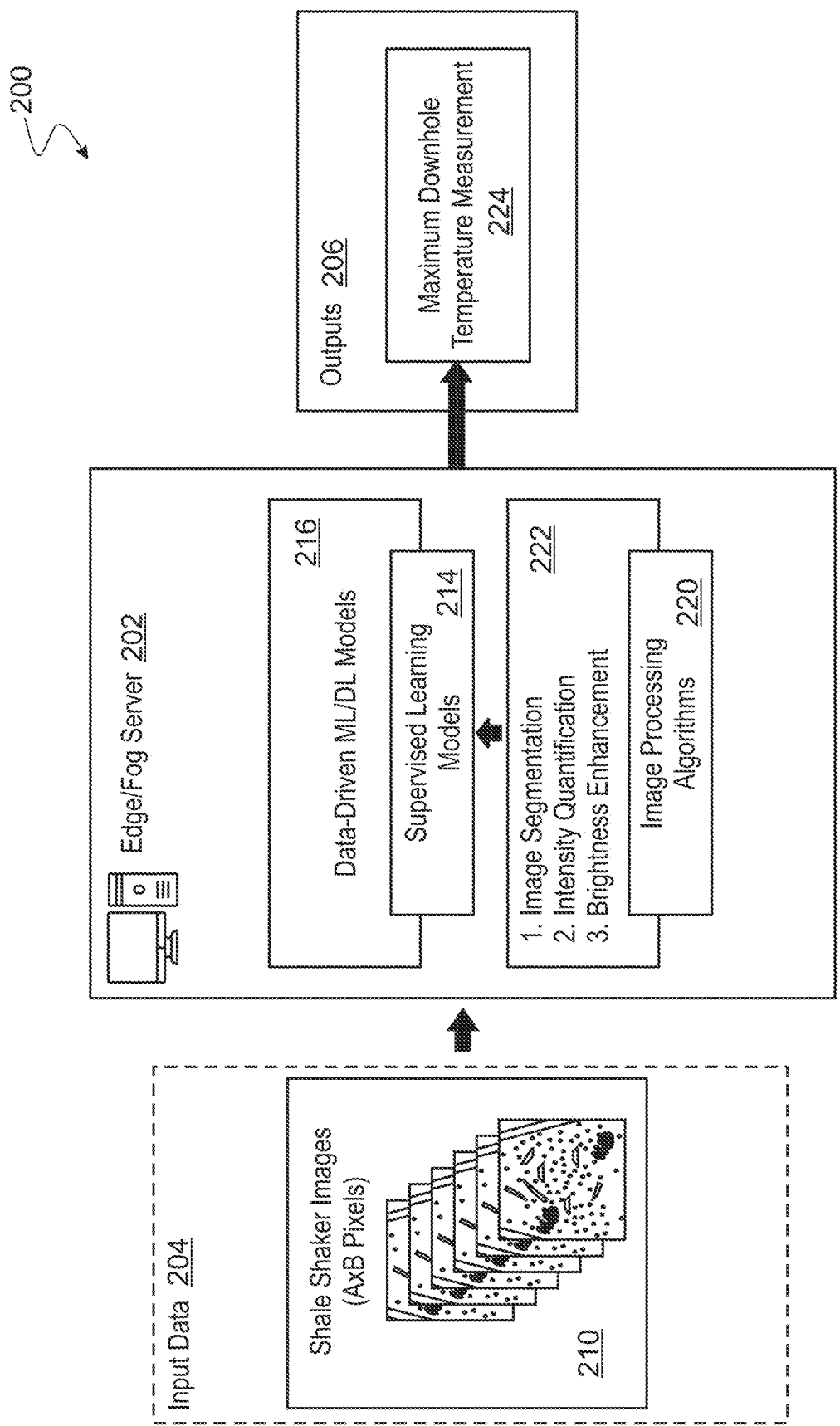
FIG. 2 is a drawing showing an example of inputs and outputs of a system for predicting maximum downhole temperature, according to some implementations of the present disclosure.

The camera at the shale shaker along with temperature sensitive polymers offer new techniques for measuring maximum downhole temperature. The novelty of the new techniques is not in the polymer formulation, as some formulations are established in industry. The novelty of the new techniques comes from using temperature-responsive polymers to measure returning maximum downhole temperature in the oil and gas industry. In addition, the new technique can use an ML/DL model that is capable of estimating temperature values from observed intensities of the polymers based on video data obtained from the shale shakers. As a result, the new techniques provide the application of continuous measurements of downhole temperature values (FIG. 2):

FIG. 2 is a drawing showing an example of inputs and outputs of a system 200 for predicting maximum downhole temperature, according to some implementations of the present disclosure. The system 200 includes an edge/fog server 202 that processes input data 204 for the system 200 and generates outputs 206.

The input data 204 can include image data (e.g., shale shaker images 210). The edge/fog server 202 can use various models, including supervised learning models 214, which can serve as inputs to data-driven ML/DL models 216. The supervised learning models 214 can use as input outputs of image processing algorithms 220 that can perform functions 222 including image segmentations, intensity quantification, and brightness enhancement. The outputs 206 include a maximum downhole temperature measurement 224.

Image data from the camera/vision sensors are expected to be primarily processed in continuous recording to capture the trends of the flow over time. The frames from the camera can be processed by the image processing algorithms 220 and the ML/DL models 216 deployed in the edge/fog server 202. The methods described in the present disclosure use a set of image processing techniques to detect polymer features (e.g., the polymer intensity, color, and light) as well as to enhance the contrast and brightness of the frames. These image processing techniques can include pixilation, image segmentation, intensity quantification, and supervised learning regression models (e.g., including ML and DL). The algorithms can convert the images to arrays (e.g., multi-dimensional arrays) that can later be translated to numerical values referring to the temperature values. The numerical representation of the intensities of the polymers mixed with the fluid observed at the shale shakers can be directly used to estimate temperature values. For instance, a simple logistic regression model may be used as follows The numerical representation of the intensities of the fluid observed at the shale shakers can be directly used to estimate temperature values. For instance, a simple logistic regression model may be used as follows:

$$\text{Temperature} = \beta \times \max(\text{pixel intensity}) \quad (1)$$

where $\beta$ refers to the coefficient learned by the regression model, and max(pixel intensity) refers to the pixel with the highest intensity values in a frame, respectively. Temperature refers to the temperature values as measured in the laboratory. The linear regression, as a supervised learning model, would learn this relationship by observing multiple samples S with their respective target labels (temperatures).

However, relying on the value of a single pixel intensity (capturing the polymer activation) may not provide enough accuracy. Consequently, supervised learning DL models, such as convolutional neural networks (CNN), and auto encoder neural networks (AE-NN), among others, can be trained or derived from the frames to classify the observed (intensity/color/light) images. These DL models automatically extract abstract features from the frames that can be linked to the temperature value as a target. In supervised learning, each frame containing the set of intensities observed from the smart polymer is assigned a label (temperature value) to train the regression DL model, as shown in FIG. 3.

To label the data (frames with their respective temperature), the smart polymer pills can be exposed to different temperature values in a controlled temperature chamber in the lab. Certain temperature values can be applied, and images of the resulting polymers can be acquired. These images, along with the actual applied temperature values, can then be used to train the ML/DL model. Notably, the laboratory data are required for the learning phase of the model as these represent the targets/labels. After the model is derived, the objective of the model is to predict these values using the images.

Figure 3:
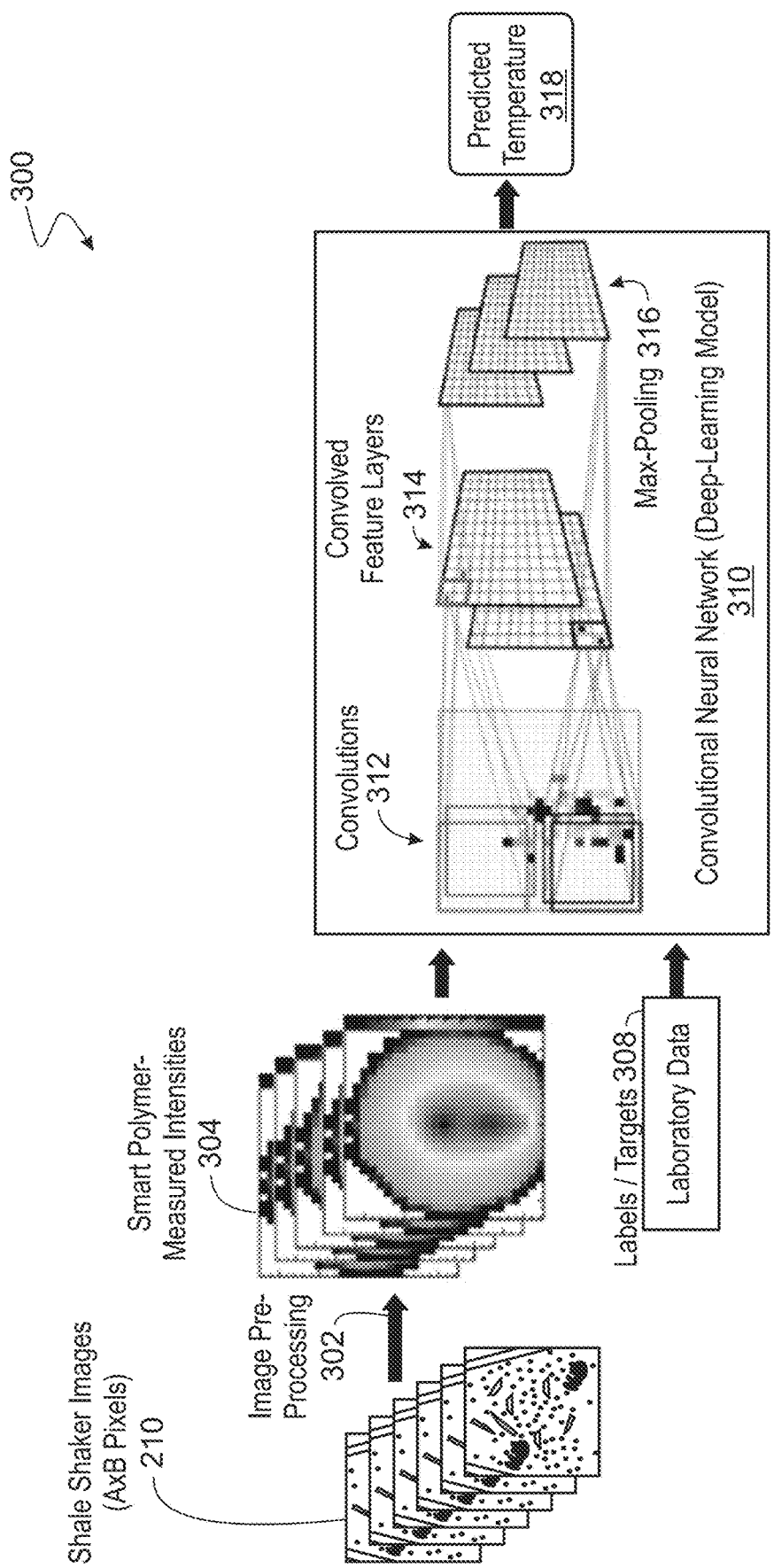
FIG. 3 is a diagram showing an example of a supervised learning method to predict/estimate maximum downhole temperatures, according to some implementations of the present disclosure.

FIG. 3 is a diagram showing an example of a supervised learning method 300 to predict/estimate maximum downhole temperatures, according to some implementations of the present disclosure. The supervised learning method 300 can be used as initial input for the shale shaker images 210. Image pre-processing 302 performed on the shale shaker images 210 can create smart polymer measured intensities 304. Labels/targets 308, along with the smart polymer measured intensities 304, can serve as inputs to a Convolutional Neural Network (CNN) (e.g., deep learning model) 310. Convolutions 312 can be used to create convolved feature layers 314 from which max-pooling 316 is performed. Output of the CNN 310 is a predicted temperature 318.

The chemical mechanism for sensing temperature in the downhole is to be an irreversible mechanism, a nonvolatile memory, with an output that gives the thermal history of what the fluorescent materials have been exposed to. While there has been significant development in real-time reversible fluorescent chemical sensors, irreversible sensors are rare. The sensors also suffer from degradability and side reactions, which may limit their efficacy in drilling muds within the downhole environment. Gold and silver nanorods, however, show promise in this field of irreversible thermochromic dyes.

Figure 4:
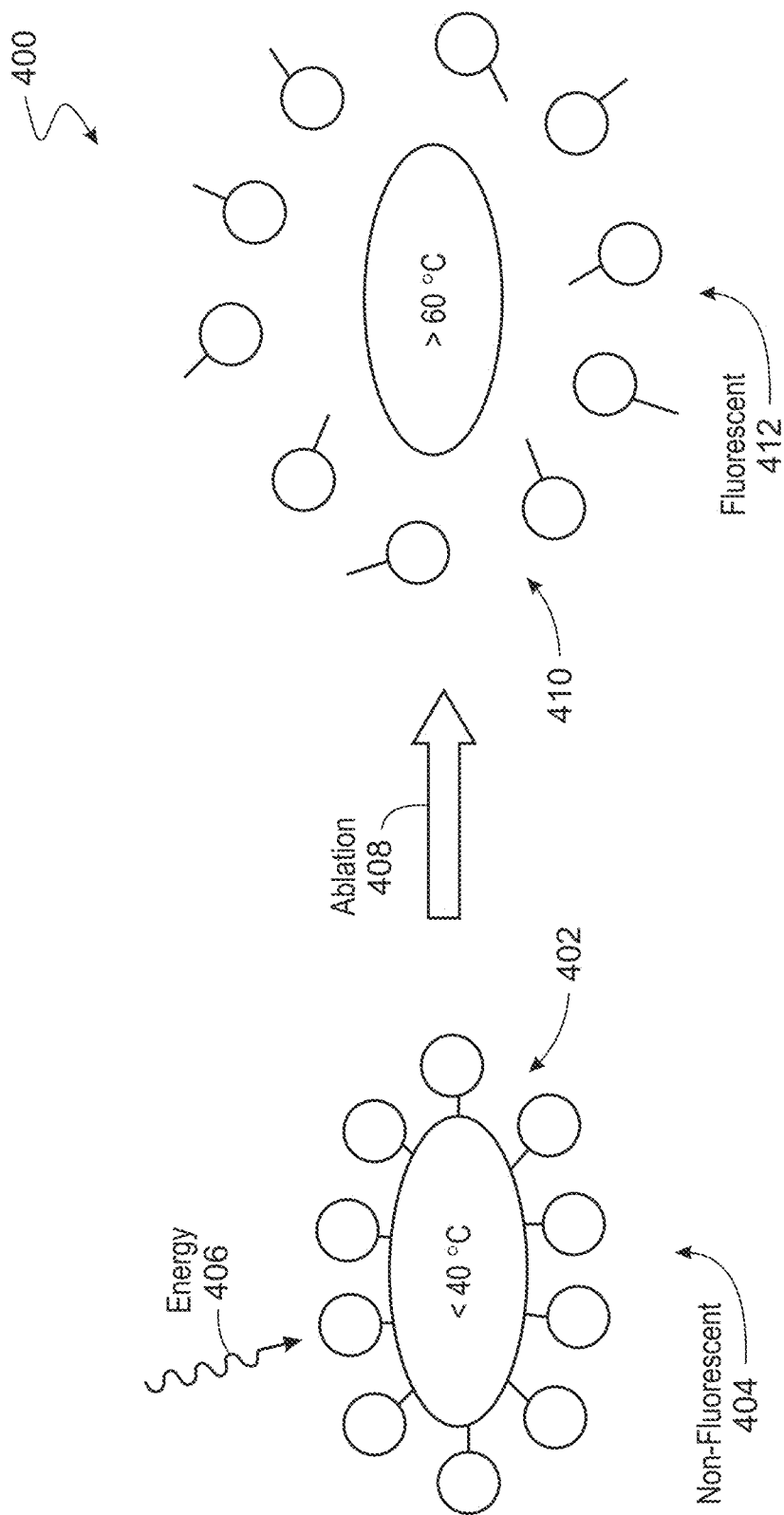
FIG. 4 is a diagram showing an example concept of thermal activation of nanoparticle fluorescence, according to some implementations of the present disclosure.

FIG. 4 is a diagram showing an example concept 400 of thermal activation of nanoparticle fluorescence, according to some implementations of the present disclosure. A gold nanoparticle 402 (e.g., at less than 40° C. (degrees Celsius)) in a non-fluorescent state 404 receives energy 406 (e.g., heat). Ablation 408 occurs, resulting in a gold nanoparticle 410 (e.g., at greater than 60 degrees Celsius) in a fluorescent state 412. The nanoparticle can be functionalized with a dye (e.g., coumarin, FIG. 5), quenching the fluorescence of the coumarin. After heating to the described temperature, the S—Au bond breaks at about 60° C. in aqueous solution, releasing the coumarin dye into the surrounding medium. The fluorescence of coumarin is no longer quenched and shows an increase in signal, as depicted in FIG. 6.

Figure 5:
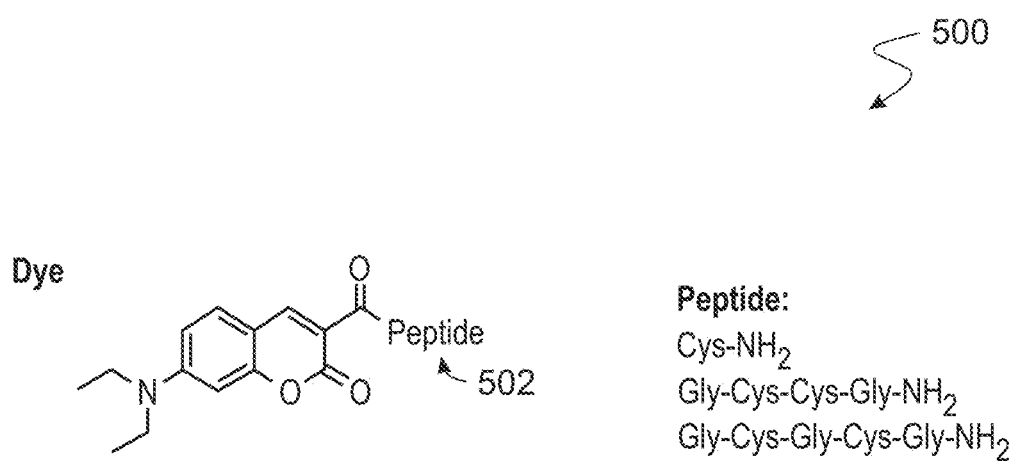
FIG. 5 is a diagram showing an example of a coumarin derivatized peptide, according to some implementations of the present disclosure.

FIG. 5 is a diagram 500 showing an example of a coumarin derivatized peptide 502, according to some implementations of the present disclosure. The peptide 502 with a thiol linking group to the surface of the gold nanoparticle has been demonstrated to work as a nanothermometer. In this example, the activation temperature in aqueous solution is between 60 and 80° C. Non-aqueous fluids are anticipated to have a slightly different activation temperature.

Figure 6:
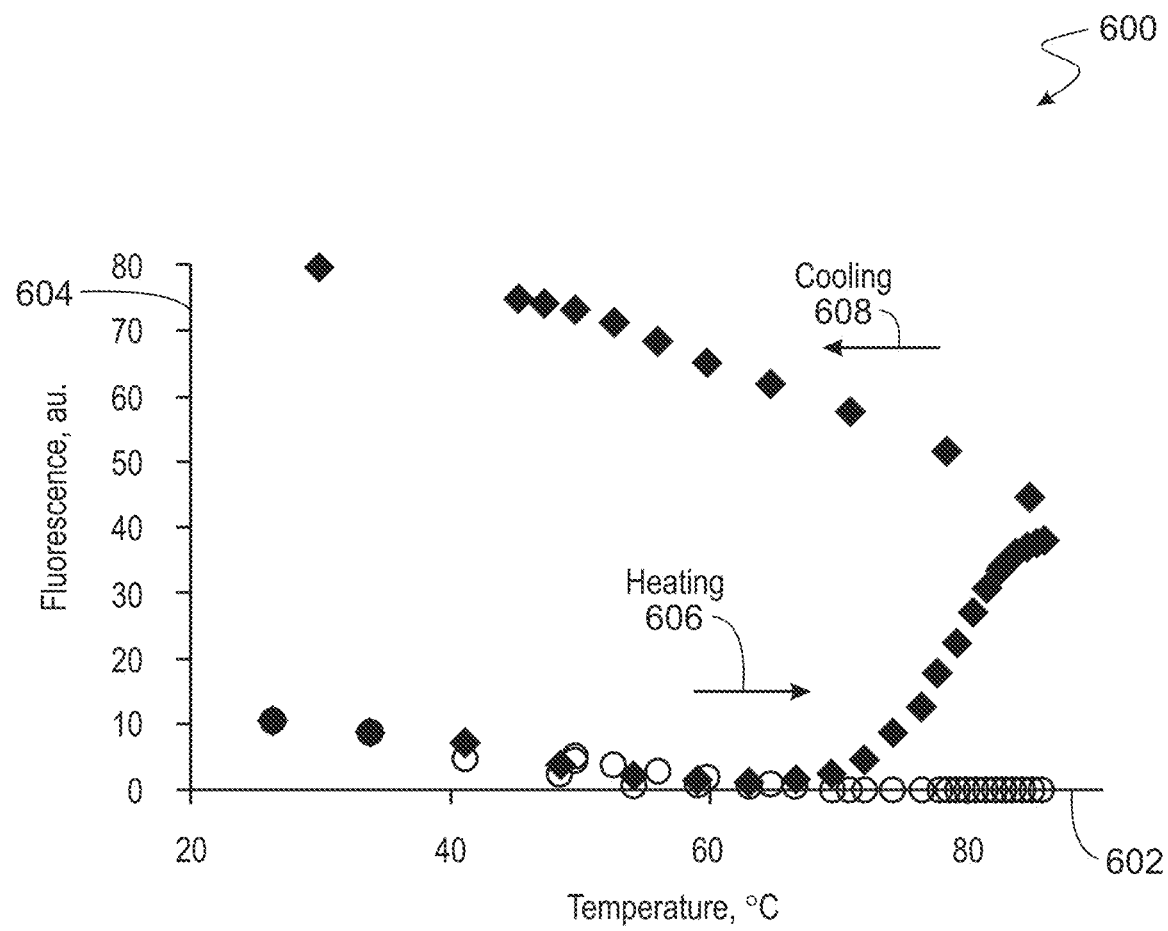
FIG. 6 is a graph illustrating an example procedure of an irreversible increase in fluorescence in response to heating of a material to a critical value, according to some implementations of the present disclosure.

FIG. 6 is a graph illustrating an example procedure 600 of an irreversible increase in fluorescence in response to heating of a material to a critical value, according to some implementations of the present disclosure. The procedure 600 illustrates a reliance upon the cleavage of an Au—S, with a nanothermometer for temperatures up to 60° C. In order to obtain a wider range for the thermal responsivity of this nanothermometer concept, thermally responsive shape changing nanoparticles can be utilized. Data points for the material used in the procedure 600 are plotted relative to temperature 602 (e.g., in ° C.) and fluorescence 604 (e.g., in arbitrary units (a.u.)) over a heating cycle 606 and a cooling cycle 608.

Figure 7:
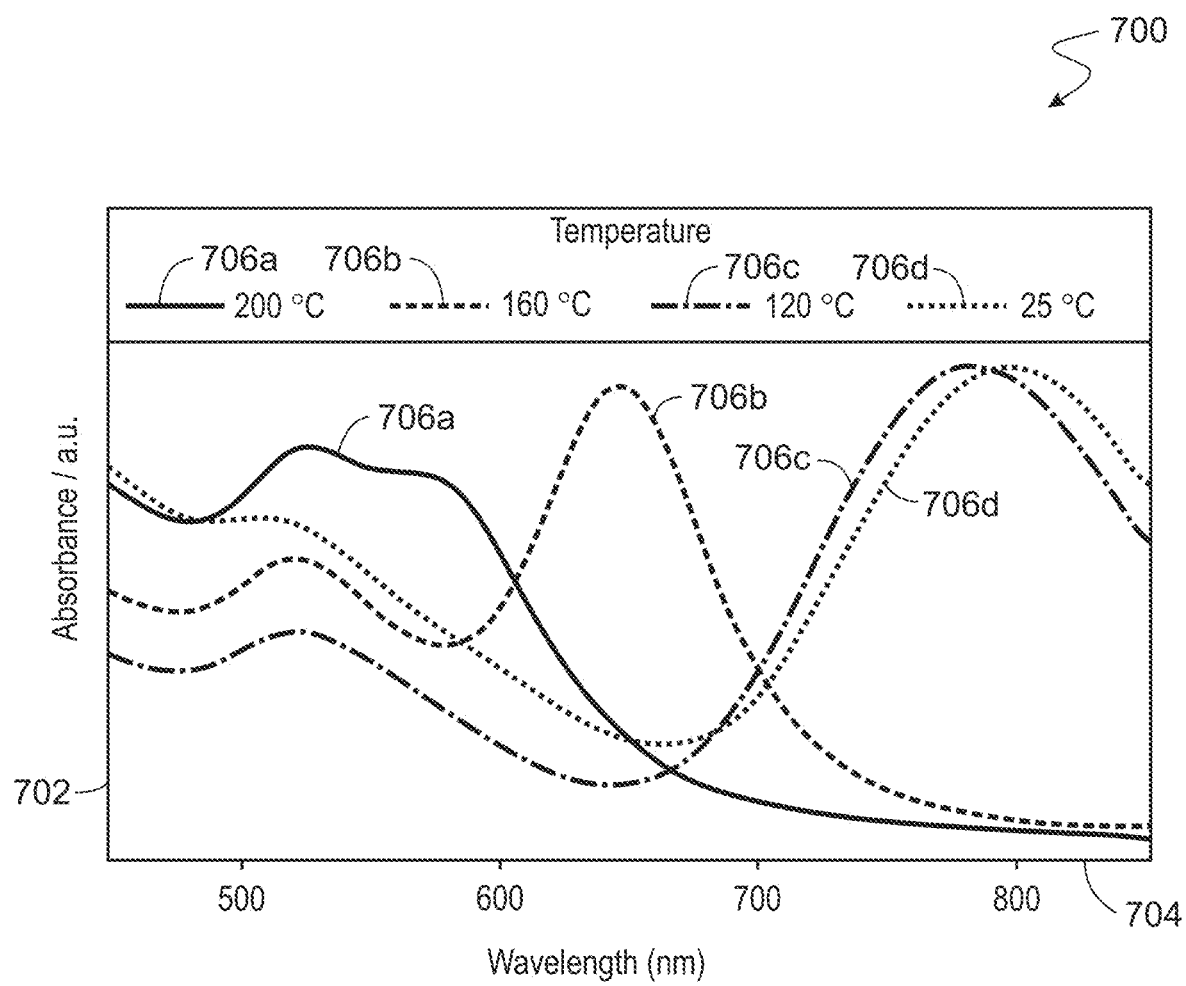
FIG. 7 is a graph illustrating example absorbance rates by wavelength for temperature plots, according to some implementations of the present disclosure.

FIG. 7 is a graph 700 illustrating example absorbance rates 702 by wavelength 704 for temperature plots 706a-706d, according to some implementations of the present disclosure. The temperature plots 706a-706d are produced for polyionic liquid gold nanorod composites (gold nanorod/poly(1-vinyl-3-ethylimidiazolium) bis(trifluoromethanesulfonimide) which have been shown to be effective as irreversible thermal sensors. The absorption changes for the composites as a function of temperature.

Figure 8:
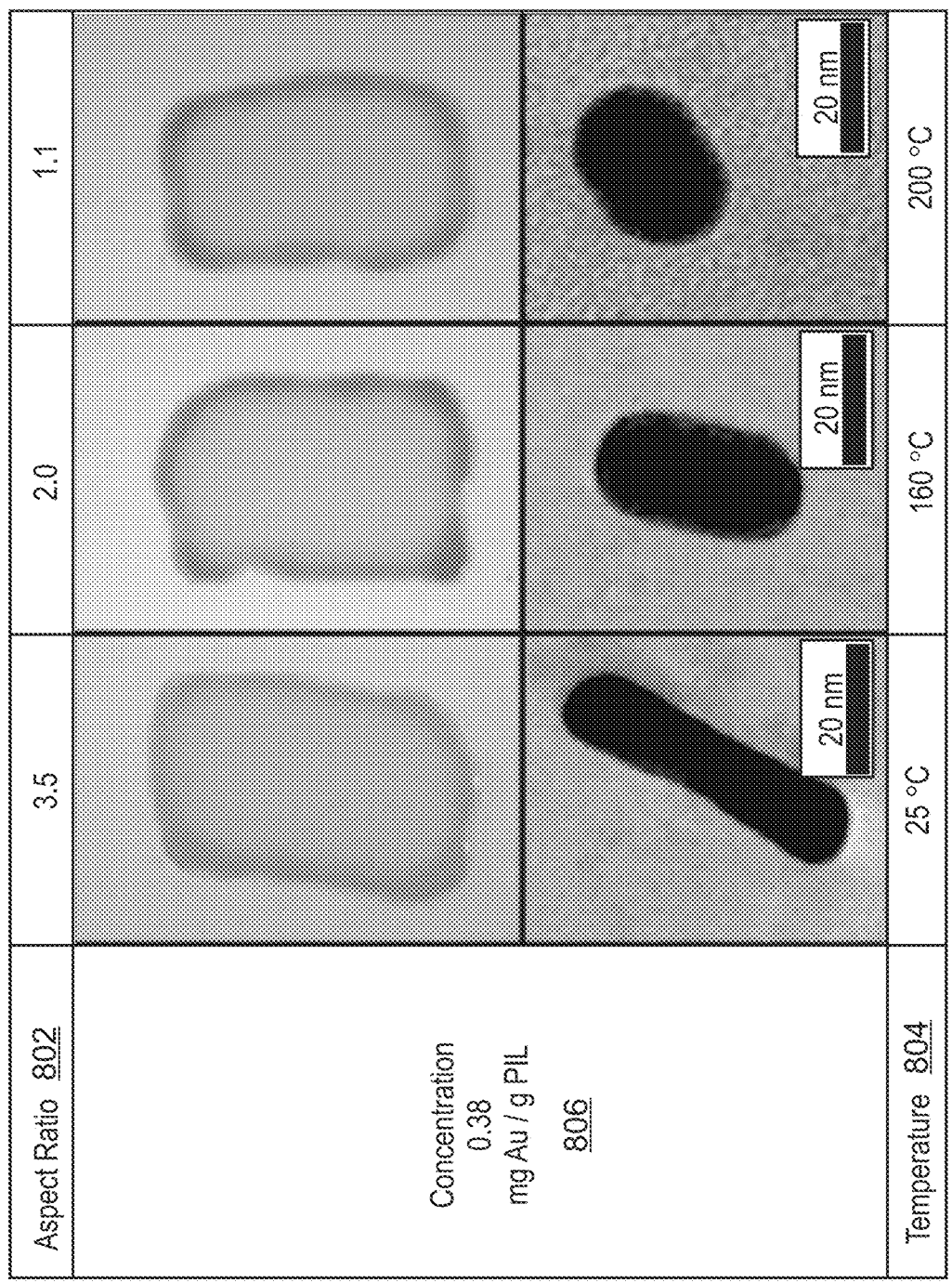
FIG. 8 is a diagram showing an example of shape-change of nanorod composite polyionic liquid film with temperature and corresponding color change, according to some implementations of the present disclosure.

FIG. 8 is a diagram 800 showing an example of shape-change of nanorod composite polyionic liquid film with temperature and corresponding color change, according to some implementations of the present disclosure. FIG. 8 shows the effects of thermal conditions on the aspect ratio and particle size on gold nanorods, for example. With a change in shape of the nanoparticle, the absorption and luminescence profiles of the particles will change (for the spectral change in the materials see FIG. 7). Since the thermally induced shape change is irreversible, this nanothermometer can be regarded as irreversible and therefore can serve as an effective material to record thermal history. The thermal effects of diagram 800 are shown for different aspect ratios 802 (e.g., 3.5, 2.0, and 1.1) and corresponding temperatures 804 (e.g., 25° C., 160° C., and 200° C.), at a concentration 806 of 3.8 mg Au/g PIL Nanorod Synthesis Gold nanorods were synthesized using the following procedure, but other procedures are possible. Then, 29 milliliters (mL) of a 0.2 (mole) M solution of cetyltrimethylammonium bromide (CTAB) were mixed with 0.3 mL of a 0.1 M $HAuCl_4$ solution (0.30 mL) and 60 µL of a 0.1 M silver chloride solution. The resulting solution had an orange hue. Then, 0.3 mL of a 0.2 M ascorbic acid solution was added and mixed to render a colorless solution. Then, 30 µL of a freshly prepared 0.001 M sodium borohydride solution was added and mixed. A deep purple color began to appear within 5 minutes. The solution was then allowed to stand for one hour, after which time the solution was centrifuged for 40 minutes at 2000 g. The supernatant was discarded to leave a pellet. The pellet was redispersed in distilled water (20 mL), and the suspension was again centrifuged with the supernatant discarded. After this step, the pellet was finally redispersed in distilled water and made up to a final volume of 60 mL Composite Nanorod Film/Solid Synthesis 5 mL of the gold nanorod suspension was then added to an aqueous solution of poly(1-vinyl-3-ethylimidiazolium bromide) liquid. An aqueous solution of lithium bis(trifluoromethanosulfonyl)imide solution (1.13 g in 2 mL) was then added dropwise with stirring to yield a pale-purple precipitate. The remaining colorless liquid was decanted off, and the solid was dried in the air. The solid particulate was then directly added to the drilling mud for temperature measurement.

Figure 9:
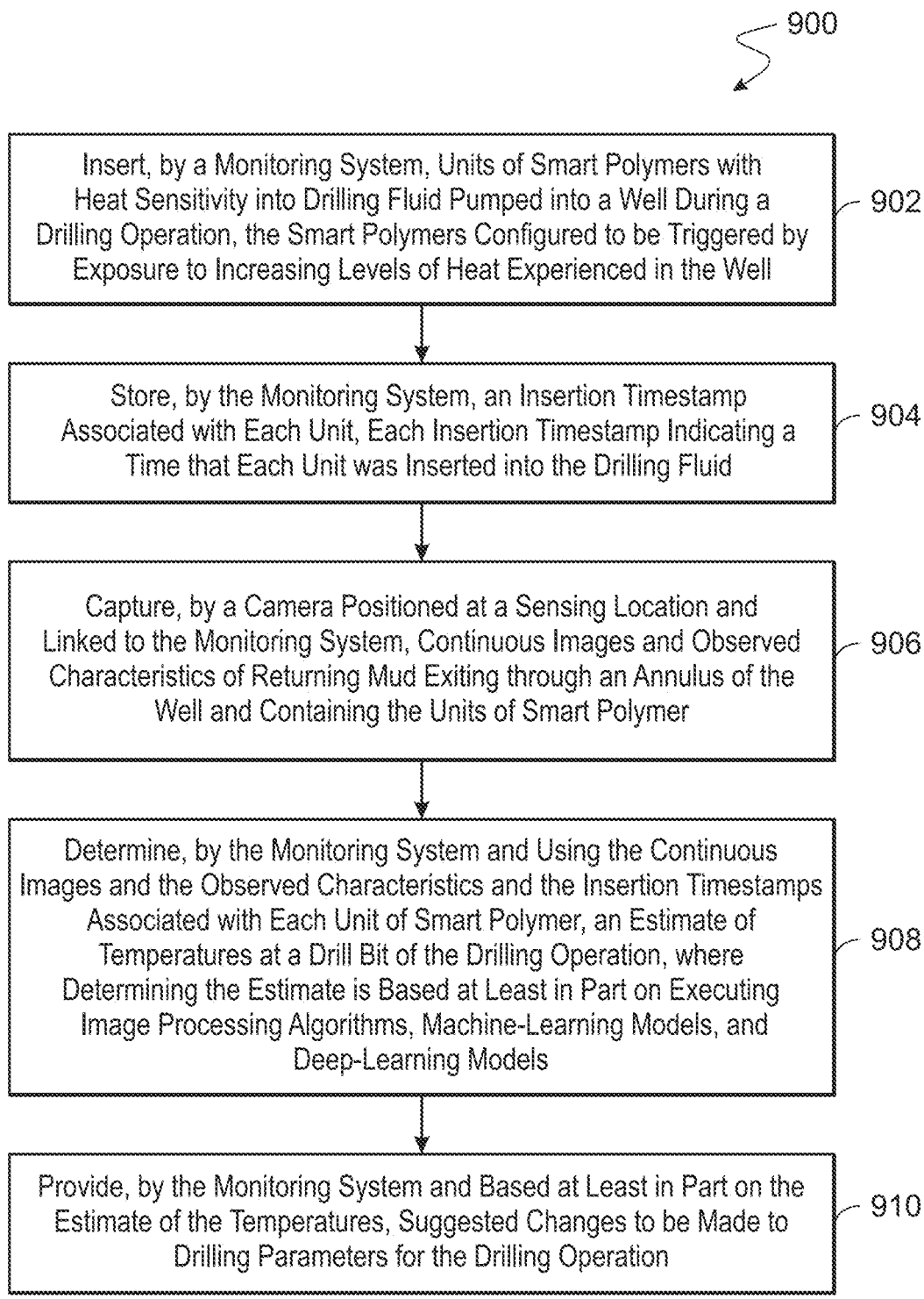
FIG. 9 is a flowchart of an example of a method for estimating maximum bottom hole temperatures at a drill bit during a drilling operation through the use of smart polymers introduced into drilling fluid and photographed in returning drilling mud after exposure to downhole conditions, according to some implementations of the present disclosure.

FIG. 9 is a flowchart of an example of a method 900 for estimating maximum bottom hole temperatures at a drill bit during a drilling operation through the use of smart polymers introduced into drilling fluid and photographed in returning drilling mud after exposure to downhole conditions, according to some implementations of the present disclosure. For clarity of presentation, the description that follows generally describes method 900 in the context of the other figures in this description. However, it will be understood that method 900 can be performed, for example, by any suitable system, environment, software, and hardware, or a combination of systems, environments, software, and hardware, as appropriate. In some implementations, various steps of method 900 can be run in parallel, in combination, in loops, or in any order.

At 902, units of smart polymers with heat sensitivity are inserted by a monitoring system into drilling fluid pumped into a well during a drilling operation. The smart polymers are configured to be triggered by exposure to increasing levels of heat experienced in the well. The units of smart polymers can have a pill shape, for example. The units of smart polymers are configured to change properties as a function of changing temperatures exposed to the units of smart polymers by downhole conditions. In some implementations, pumping the units of smart polymers into the drilling fluid can occur at different intervals (e.g., every one, three, or five minutes) or can be pumped every one stand (e.g., every 90 feet). From 902, method 900 proceeds to 904.

At 904, an insertion timestamp associated with each unit is stored by the monitoring system. Each insertion timestamp indicates a time that each unit was inserted into the drilling fluid. From 904, method 900 proceeds to 906.

At 906, continuous images and observed characteristics of returning mud exiting through an annulus of the well and containing the units of smart polymer are captured by a camera positioned at a sensing location and linked to the monitoring system. Capturing the continuous images can include capturing, in the units of smart polymers, evidence of changing temperatures caused by heat exposure experienced by the units of smart polymers. The sensing location can be, for example, a shale shaker, a centrifuge, a de-sander, and a de-silter. From 906, method 900 proceeds to 908.

At 908, an estimate of temperatures at a drill bit of the drilling operation is determined by the monitoring system using the continuous images, the observed characteristics, and the insertion timestamps associated with each unit of smart polymer. Determining the estimate is based at least in part on executing image processing algorithms, machine-learning models, and deep-learning models. Determining the estimate of temperatures can include correlating an arrival timestamp and identifying a time-of-arrival of each unit of smart polymer at the sensing location with a respective hole depth by utilizing a rig sensor for mud flow rate and based on an annular area of the well. From 908, method 900 proceeds to 910.

At 910, suggested changes to be made to drilling parameters for the drilling operation are provided by the monitoring system based at least in part on the estimate of the temperatures. For example, changes can be made in drilling parameters that are associated with changes in mud rheology, mud weight, and mud flow rate. After 910, method 900 can stop.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 10:
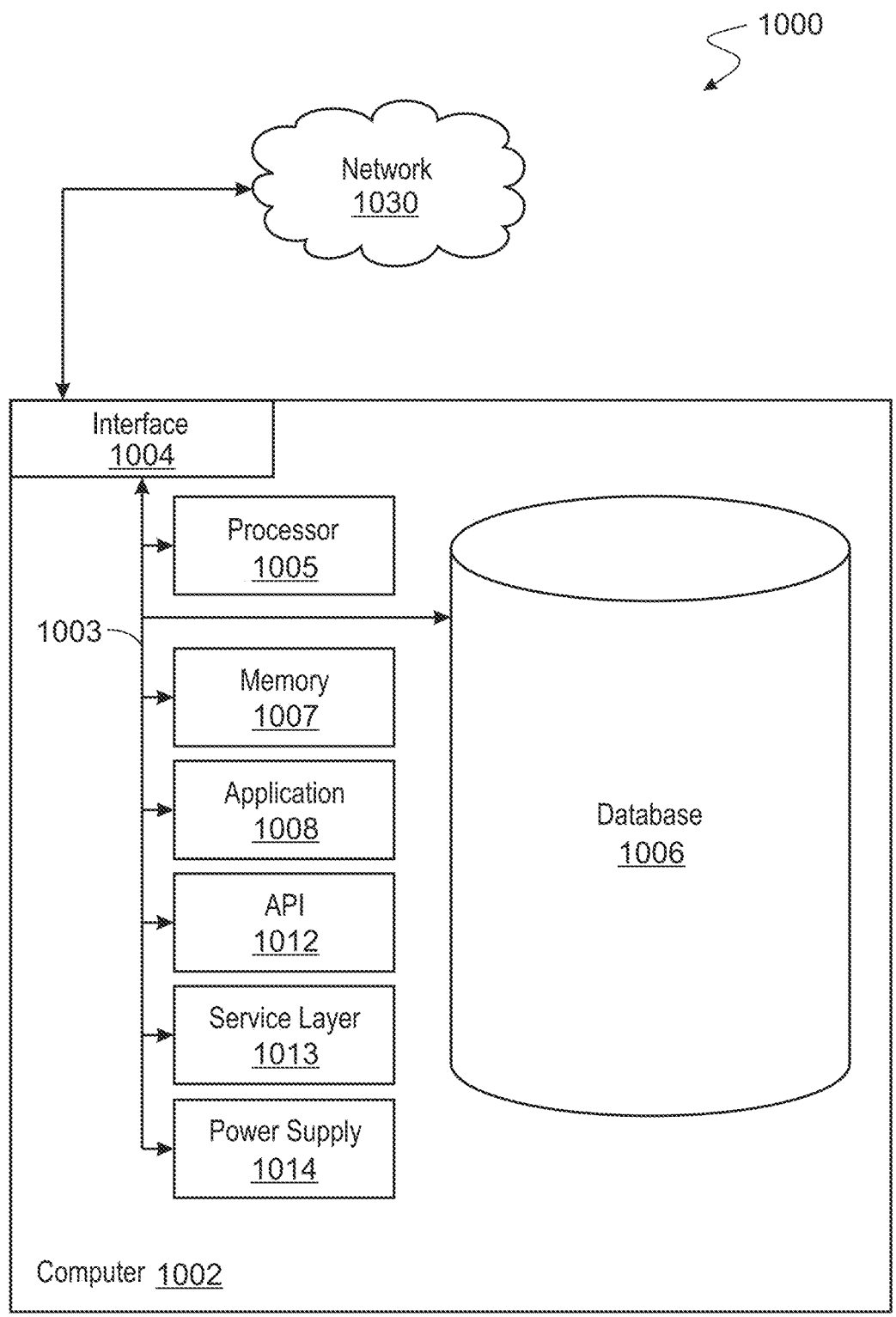
FIG. 10 is a block diagram illustrating an example computer system used to provide computational functionalities associated with described algorithms, methods, functions, processes, flows, and procedures as described in the present disclosure, according to some implementations of the present disclosure.

FIG. 10 is a block diagram of an example computer system 1000 used to provide computational functionalities associated with described algorithms, methods, functions, processes, flows, and procedures described in the present disclosure, according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI).

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a top level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1003. In some implementations, any or all of the components of the computer 1002, including hardware or software components, can interface with each other or the interface 1004 (or a combination of both) over the system bus 1003. Interfaces can use an application programming interface (API) 1012, a service layer 1013, or a combination of the API 1012 and service layer 1013. The API 1012 can include specifications for routines, data structures, and object classes. The API 1012 can be either computer-language independent or dependent. The API 1012 can refer to a complete interface, a single function, or a set of APIs.

The service layer 1013 can provide software services to the computer 1002 and other components (whether illustrated or not) that are communicably coupled to the computer 1002. The functionality of the computer 1002 can be accessible for all service consumers using this service layer. Software services, such as those provided by the service layer 1013, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1012 or the service layer 1013 can be stand-alone components in relation to other components of the computer 1002 and other components communicably coupled to the computer 1002. Moreover, any or all parts of the API 1012 or the service layer 1013 can be implemented as child or sub-modules of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 also includes a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

The application 1008 can be an algorithmic software engine providing functionality according to particular needs, desires, or particular implementations of the computer 1002 and the described functionality. For example, application 1008 can serve as one or more components, modules, or applications. Further, although illustrated as a single application 1008, the application 1008 can be implemented as multiple applications 1008 on the computer 1002. In addition, although illustrated as internal to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power supply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Described implementations of the subject matter can include one or more features, alone or in combination.

For example, in a first implementation, a computer-implemented method includes the following. Units of smart polymers with heat sensitivity are inserted by a monitoring system into drilling fluid pumped into a well during a drilling operation. The smart polymers are configured to be triggered by exposure to increasing levels of heat experienced in the well. An insertion timestamp associated with each unit is stored by the monitoring system. Each insertion timestamp indicates a time that each unit was inserted into the drilling fluid. Continuous images and observed characteristics of returning mud exiting through an annulus of the well and containing the units of smart polymer are captured by a camera positioned at a sensing location and linked to the monitoring system. An estimate of temperatures at a drill bit of the drilling operation is determined by the monitoring system using the continuous images, the observed characteristics, and the insertion timestamps associated with each unit of smart polymer. Determining the estimate is based at least in part on executing image processing algorithms, machine-learning models, and deep-learning models. Suggested changes to be made to drilling parameters for the drilling operation are provided by the monitoring system based at least in part on the estimate of the temperatures.

The foregoing and other described implementations can each, optionally, include one or more of the following features:

A first feature, combinable with any of the following features, where the units of smart polymers have a pill shape.

A second feature, combinable with any of the previous or following features, where the method further includes pumping the units of smart polymers into the drilling fluid at different time intervals or every one stand.

A third feature, combinable with any of the previous or following features, where the units of smart polymers are configured to change properties as a function of changing temperatures exposed to the units of smart polymers by downhole conditions.

A fourth feature, combinable with any of the previous or following features, where capturing the continuous images includes capturing, in the units of smart polymers, evidence of changing temperatures experienced by the units of smart polymers.

A fifth feature, combinable with any of the previous or following features, where determining the estimate of temperatures includes correlating an arrival timestamp identifying a time of arrival of each unit of smart polymer at the sensing location with a respective hole depth by utilizing a rig sensor for mud flow rate and based on an annular area of the well.

A sixth feature, combinable with any of the previous or following features, where the sensing location is selected from the group consisting of a shale shaker, a centrifuge, a de-sander, and a de-silter.

In a second implementation, a non-transitory, computer-readable medium stores one or more instructions executable by a computer system to perform operations including the following. Units of smart polymers with heat sensitivity are inserted by a monitoring system into drilling fluid pumped into a well during a drilling operation. The smart polymers are configured to be triggered by exposure to increasing levels of heat experienced in the well. An insertion timestamp associated with each unit is stored by the monitoring system. Each insertion timestamp indicates a time that each unit was inserted into the drilling fluid. Continuous images and observed characteristics of returning mud exiting through an annulus of the well and containing the units of smart polymer are captured by a camera positioned at a sensing location and linked to the monitoring system. An estimate of temperatures at a drill bit of the drilling operation is determined by the monitoring system using the continuous images, the observed characteristics, and the insertion timestamps associated with each unit of smart polymer. Determining the estimate is based at least in part on executing image processing algorithms, machine-learning models, and deep-learning models. Suggested changes to be made to drilling parameters for the drilling operation are provided by the monitoring system based at least in part on the estimate of the temperatures.

The foregoing and other described implementations can each, optionally, include one or more of the following features:

A first feature, combinable with any of the following features, where the units of smart polymers have a pill shape.

A second feature, combinable with any of the previous or following features, where the operations further include pumping the units of smart polymers into the drilling fluid at different time intervals or every one stand.

A third feature, combinable with any of the previous or following features, where the units of smart polymers are configured to change properties as a function of changing temperatures exposed to the units of smart polymers by downhole conditions.

A fourth feature, combinable with any of the previous or following features, where capturing the continuous images includes capturing, in the units of smart polymers, evidence of changing temperatures experienced by the units of smart polymers.

A fifth feature, combinable with any of the previous or following features, where determining the estimate of temperatures includes correlating an arrival timestamp identifying a time of arrival of each unit of smart polymer at the sensing location with a respective hole depth by utilizing a rig sensor for mud flow rate and based on an annular area of the well.

A sixth feature, combinable with any of the previous or following features, where the sensing location is selected from the group consisting of a shale shaker, a centrifuge, a de-sander, and a de-silter.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Units of smart polymers with heat sensitivity are inserted by a monitoring system into drilling fluid pumped into a well during a drilling operation. The smart polymers are configured to be triggered by exposure to increasing levels of heat experienced in the well. An insertion timestamp associated with each unit is stored by the monitoring system. Each insertion timestamp indicates a time that each unit was inserted into the drilling fluid. Continuous images and observed characteristics of returning mud exiting through an annulus of the well and containing the units of smart polymer are captured by a camera positioned at a sensing location and linked to the monitoring system. An estimate of temperatures at a drill bit of the drilling operation is determined by the monitoring system using the continuous images, the observed characteristics, and the insertion timestamps associated with each unit of smart polymer. Determining the estimate is based at least in part on executing image processing algorithms, machine-learning models, and deep-learning models. Suggested changes to be made to drilling parameters for the drilling operation are provided by the monitoring system based at least in part on the estimate of the temperatures.

The foregoing and other described implementations can each, optionally, include one or more of the following features:

A first feature, combinable with any of the following features, where the units of smart polymers have a pill shape.

A second feature, combinable with any of the previous or following features, where the operations further include pumping the units of smart polymers into the drilling fluid at different time intervals or every one stand.

A third feature, combinable with any of the previous or following features, where the units of smart polymers are configured to change properties as a function of changing temperatures exposed to the units of smart polymers by downhole conditions.

A fourth feature, combinable with any of the previous or following features, where capturing the continuous images includes capturing, in the units of smart polymers, evidence of changing temperatures experienced by the units of smart polymers.

A fifth feature, combinable with any of the previous or following features, where determining the estimate of temperatures includes correlating an arrival timestamp identifying a time of arrival of each unit of smart polymer at the sensing location with a respective hole depth by utilizing a rig sensor for mud flow rate and based on an annular area of the well.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks.

Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
storing an insertion timestamp associated with insertion of each unit of smart polymers, each insertion timestamp indicating a time that each unit of smart polymers was inserted into
a drilling fluid pumped into a well during a drilling operation, the smart polymers being configured to be triggered by exposure to increasing levels of heat experienced in the well;
controlling, a camera positioned at a sensing location, to continuously capture images and observed characteristics of returning mud exiting through an annulus of the well and comprising the units of smart polymer;
determining, by using the images and the observed characteristics and the insertion timestamps associated with each unit of smart polymer, an estimate of temperatures at a drill bit of the drilling operation, wherein determining the estimate is based at least in part on executing image processing algorithms; and
triggering, by based at least in part on the estimate of the temperatures, an adjustment of drilling parameters for the drilling operation.

2. The computer-implemented method of claim 1, wherein the units of smart polymers have a pill shape.

3. The computer-implemented method of claim 1, further comprising:
pumping the units of smart polymers into the drilling fluid at different time intervals or every one stand.

4. The computer-implemented method of claim 1, wherein the units of smart polymers are configured to change properties as a function of changing temperatures exposed to the units of smart polymers by downhole conditions.

5. The computer-implemented method of claim 1, wherein capturing the images comprises capturing, in the units of smart polymers, evidence of changing temperatures experienced by the units of smart polymers.

6. The computer-implemented method of claim 1, wherein determining the estimate of temperatures comprises correlating an arrival timestamp identifying a time of arrival of each unit of smart polymer at the sensing location with a respective hole depth by utilizing a rig sensor for mud flow rate and based on an annular area of the well.

7. The computer-implemented method of claim 1, wherein the sensing location is selected from the group consisting of a shale shaker, a centrifuge, a de-sander, and a de-silter.

8. A non-transitory, computer-readable medium storing one or more instructions executable by a computer system to perform operations comprising:
storing an insertion timestamp associated with insertion of each unit of smart polymers, each insertion timestamp indicating a time that each unit of smart polymers was inserted into a drilling fluid pumped into a well during a drilling operation, the smart polymers being configured to be triggered by exposure to increasing levels of heat experienced in the well;
controlling, a camera positioned at a sensing location, to continuously capture images and observed characteristics of returning mud exiting through an annulus of the well and comprising the units of smart polymer;
determining, by using the images and the observed characteristics and the insertion timestamps associated with each unit of smart polymer, an estimate of temperatures at a drill bit of the drilling operation, wherein determining the estimate is based at least in part on executing image processing algorithms; and
triggering, by based at least in part on the estimate of the temperatures, an adjustment of drilling parameters for the drilling operation.

9. The non-transitory, computer-readable medium of claim 8, wherein the units of smart polymers have a pill shape.

10. The non-transitory, computer-readable medium of claim 8, the operations further comprising:
pumping the units of smart polymers into the drilling fluid at different time intervals or every one stand.

11. The non-transitory, computer-readable medium of claim 8, wherein the units of smart polymers are configured to change properties as a function of changing temperatures exposed to the units of smart polymers by downhole conditions.

12. The non-transitory, computer-readable medium of claim 8, wherein capturing the images comprises capturing, in the units of smart polymers, evidence of changing temperatures experienced by the units of smart polymers.

13. The non-transitory, computer-readable medium of claim 8, wherein determining the estimate of temperatures comprises correlating an arrival timestamp identifying a time of arrival of each unit of smart polymer at the sensing location with a respective hole depth by utilizing a rig sensor for mud flow rate and based on an annular area of the well.

14. The non-transitory, computer-readable medium of claim 8, wherein the sensing location is selected from the group consisting of a shale shaker, a centrifuge, a de-sander, and a de-silter.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
storing an insertion timestamp associated with insertion of each unit of smart polymers, each insertion timestamp indicating a time that each unit of smart polymers was inserted into a drilling fluid pumped into a well during a drilling operation, the smart polymers being configured to be triggered by exposure to increasing levels of heat experienced in the well;

controlling, a camera positioned at a sensing location, to continuously capture images and observed characteristics of returning mud exiting through an annulus of the well and comprising the units of smart polymer;

determining, by using the images and the observed characteristics and the insertion timestamps associated with each unit of smart polymer, an estimate of temperatures at a drill bit of the drilling operation, wherein determining the estimate is based at least in part on executing image processing algorithms; and triggering, by based at least in part on the estimate of the temperatures, an adjustment of drilling parameters for the drilling operation.

16. The computer-implemented system of claim 15, wherein the units of smart polymers have a pill shape.

17. The computer-implemented system of claim 15, the operations further comprising:

pumping the units of smart polymers into the drilling fluid at different time intervals or every one stand.

18. The computer-implemented system of claim 15, wherein the units of smart polymers are configured to change properties as a function of changing temperatures exposed to the units of smart polymers by downhole conditions.

19. The computer-implemented system of claim 15, wherein capturing the images comprises capturing, in the units of smart polymers, evidence of changing temperatures experienced by the units of smart polymers.

20. The computer-implemented system of claim 15, wherein determining the estimate of temperatures comprises correlating an arrival timestamp identifying a time of arrival of each unit of smart polymer at the sensing location with a respective hole depth by utilizing a rig sensor for mud flow rate and based on an annular area of the well.

* * * * *